(12) United States Patent
Smethers (10) Patent No.: US 6,587,132 B1
(45) Date of Patent: Jul. 1, 2003

(54) METHOD AND SYSTEM FOR EFFICIENTLY NAVIGATING A TEXT ENTRY CURSOR PROVIDED BY A MOBILE DEVICE

(75) Inventor: Paul A. Smethers, Seattle, WA (US)

(73) Assignee: Openwave Systems Inc., Redwood City, CA (US)

( * ) Notice: Subject to any disclaimer, the term of this patent is extended or adjusted under 35 U.S.C. 154(b) by 391 days.

(21) Appl. No.: 09/611,426

(22) Filed: Jul. 7, 2000

(51) Int. Cl.[7] .................................................. G09G 5/08
(52) U.S. Cl. ...................... 345/858; 345/856; 345/160; 707/531
(58) Field of Search ................................ 345/856, 857, 345/858, 864, 160; 707/531

(56) References Cited

U.S. PATENT DOCUMENTS

| 3,654,609 A | * | 4/1972 | Bluethman et al. ......... 358/1.18 |
| 4,369,439 A | * | 1/1983 | Broos .......................... 345/164 |
| 4,760,386 A | * | 7/1988 | Heath et al. ................. 345/180 |
| 5,201,033 A | * | 4/1993 | Eagen et al. ................. 345/754 |
| 5,809,415 A | | 9/1998 | Rossmann |
| 5,818,437 A | | 10/1998 | Grover et al. |
| 5,905,486 A | | 5/1999 | Brittenham et al. |
| 5,911,485 A | | 6/1999 | Rossmann |
| 6,011,554 A | | 1/2000 | King et al. |
| 6,209,009 B1 | | 3/2001 | Schwartz et al. |

FOREIGN PATENT DOCUMENTS

JP          11-184846       *  9/1999

* cited by examiner

Primary Examiner—Kristine Kincaid
Assistant Examiner—Sajeda Muhebbullah
(74) Attorney, Agent, or Firm—Beyer Weaver & Thomas, LLP (57) ABSTRACT

Improved approaches are disclosed for efficiently navigating a cursor to an edit location within previously entered text so that the text can be edited. These improved approaches enable users to position a cursor within previously entered text more quickly and with greater ease than conventionally possible. These approaches are particularly well suited for small scale mobile devices having reduced size displays and limited keys such as mobile phones (e.g., cellular phones), two-way pagers, Personal Digital Assistants (PDAs), or other two-way mobile communication devices.

21 Claims, 10 Drawing Sheets

Message:
John, canyou go to lunch with me next week?|

*FIG. 5A*

Message:
John, canyou go to lunch with me next week |?

*FIG. 5B*

Message:
John, canyou go to lunch with me next wee|k?

*FIG. 5C*

Message:
John, canyou go to lunch with me next we|ek?

*FIG. 5D*

Message:
John, canyou go to lunch with me next w|eek?

*FIG. 5E*

Message:
John, canyou go to lunch with me next
|week?

*FIG. 5F*

Message:
John, canyou go to lunch with me|next
week ?

*FIG. 5G*

Message:
John, canyou go to lunch with|me next
week?

*FIG. 5H*

Message:
John, canyou go to lunch|with me next
week?

*FIG. 5I*

Message:
John, canyou go to
|lunch with me next
week?

*FIG. 5J*

Message:
John, canyou go | to lunch with me next week?

FIG. 5K

Message:
John, canyou | go to lunch with me next week ?

FIG. 5L

Message:
John, | canyou go to lunch with me next week?

FIG. 5M

Message:
John, c|anyou go to lunch with me next week?

*FIG. 5N*

Message:
John, ca|nyou go to lunch with me next week ?

*FIG. 5O*

Message:
John, can| you go to lunch with me next week?

*FIG. 5P*

Message:
John, can you go to lunch with me next week?

*FIG. 5Q*

METHOD AND SYSTEM FOR EFFICIENTLY NAVIGATING A TEXT ENTRY CURSOR PROVIDED BY A MOBILE DEVICE

BACKGROUND OF THE INVENTION

1. Field of the Invention

The present invention relates to mobile devices and, more particularly, to cursor navigation for mobile devices.

2. Description of the Related Art

Computing devices normally provide text entry capabilities for users. With desktop and laptop computers, text entry is facilitated by a full-size (or nearly full-size) keyboard and a pointing device. The pointing device can be a mouse, a trackball, etc. which serves to move a cursor. The cursor is displayed on a display of the computing device. The cursor designates the position or location where new text is to be entered or where existing text is to be edited.

Unfortunately, small scale computing devices (e.g., cellular phones, two-way pagers, etc.) tend to have limited size keypads and lack any pointing device to provide cursor movement. As a result, it is often tedious and time consuming for users to edit text on these small scale computing devices. To move a cursor (e.g., without deleting text) for purposes of editing text, a user is conventionally only able to move the cursor left or right by a single character by pressing left and right arrow keys, respectively, on the keypad. When the cursor is to be moved more than several words from the cursors current position, the user is thus required to press one of the arrow keys numerous times (one press for each character position). The numerous key presses that are required are burdensome and annoying to users. Due to limited processing capabilities of these small scale computing devices, the responsiveness to updating the display with the new cursor position following each arrow key press is also sluggish. While some small scale computing devices allow a button's function to be repeated when the button remains held down, attempting to move the cursor in such a manner is also painfully slow to users because of the limited processing capabilities.

Thus, there is a need for improved techniques to navigate a cursor through text on a small scale computing device.

SUMMARY OF THE INVENTION

Broadly speaking, the invention relates to improved approaches for efficiently navigating a cursor to an edit location within previously entered text so that the text can be edited. Through use of the invention, users are able to position a cursor within previously entered text more quickly and with greater ease than conventionally possible. The invention is particularly well suited for small scale mobile devices having reduced size displays and limited keys such as mobile phones (e.g., cellular phones), two-way pagers, Personal Digital Assistants (PDAs), or other two-way mobile communication devices.

The invention can be implemented in numerous ways, including as a method, a computer readable medium, an apparatus, and a system. Several embodiments of the invention are discussed below.

As a method for navigating through text being displayed on a display of a mobile device, one embodiment of the invention includes at least the acts of: receiving a cursor navigation input that requests movement of a cursor in a particular direction with respect to the text; determining whether the cursor is within a word of the text; advancing the cursor to a next character of the text in the particular direction when the determining determines that the cursor is within a word of the text; and advancing the cursor to a next word of the text in the particular direction when the determining determines that the cursor is not within a word of the text.

As a method for navigating a cursor through text displayed on a display of a mobile device, the mobile device having a keypad, one embodiment of the invention includes at least the acts of: receiving a navigation input via the keypad, and determining whether the navigation input requests movement of the cursor in a forward or backward direction with respect to the text. When it is determined that the navigation input requests movement of the cursor in the forward direction, at least the following acts are performed: determining whether a next character in the text in the forward direction from the cursor is a word delimiter; advancing the cursor one character in the forward direction when the determining determines that the next character in the text in the forward direction from the cursor is not a word delimiter; and advancing the cursor in the forward direction until just before a next word delimiter or the end of the text, whichever occurs first, when the determining determines that the next character in the text in the forward direction from the cursor is a word delimiter. Alternatively, when it is determined that the navigation input requests movement of the cursor in the backward direction, at least the following acts are performed: determining whether a next character in the text in the backward direction from the cursor is a word delimiter; advancing the cursor one character in the backward direction when the determining determines that the next character in the text in the backward direction from the cursor is not a word delimiter; and advancing the cursor in the backward direction until just before a next word delimiter or the beginning of the text, whichever occurs first, when the determining determines that the next character in the text in the backward direction from the cursor is a word delimiter.

As a computer readable medium including at least computer program code for navigating a cursor through text displayed on a display of a mobile device, the mobile device having a keypad, one embodiment of the invention includes at least: computer program code for receiving a navigation input via the keypad, the navigation input requesting movement of the cursor in a particular direction with respect to the text; computer program code for determining whether a next character in the text in the particular direction from the cursor is a word delimiter; computer program code for advancing the cursor one character within the text in the particular direction when the computer program code for determining determines that the next character in the text in the particular direction from the cursor is not a word delimiter; and computer program code for advancing the cursor within the text in the particular direction until just before a next word delimiter when the computer program code for determining determines that the next character in the text in the particular direction from the cursor is a word delimiter.

As a mobile device, one embodiment of the invention includes at least: a display configured to display text entered by a user; a keypad to facilitate text entry by the user; and a processor configured to control operation of the mobile device. The processor is configured to provide assisted navigation through the text being displayed on the display by operating to receive a cursor navigation input that requests movement of a cursor in a particular direction with respect to the text, to determine whether the cursor is within a word of the text, to advance the cursor to a next character of the text in the particular direction when it is determined that the cursor is within a word of the text; and to advance the cursor to a next word of the text in the particular direction when it is determined that the cursor is not within a word of the text.

The advantages of the invention are numerous. Different embodiments or implementations may yield one or more of the following advantages. One advantage of the invention is that cursor navigation is more efficient and less burdensome for users of mobile devices. Another advantage of the invention is that a user is often able to move a cursor within text with fewer button presses and greater speed.

Other aspects and advantages of the invention will become apparent from the following detailed description, taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved approaches for efficiently navigating a cursor to an edit location within previously entered text so that the text can be edited. Through use of the invention, users are able to position a cursor within previously entered text more quickly and with greater ease than conventionally possible.

The invention is particularly well suited for small scale mobile devices having reduced size displays and limited keys such as mobile phones (e.g., cellular phones), two-way pagers, Personal Digital Assistants (PDAs), or other two-way mobile communication devices. Such devices typically have significantly less memory and processing capability than is found in desktop and laptop computers. These devices typically have small display screens and limited size keypads as compared to the keyboards and display screens associated with desktop or laptop computers.

In the following detailed description of the invention, numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the invention.

Embodiments of the invention are discussed below with reference to FIGS. 1A–5Q. However, those skilled in the art will readily appreciate that the detailed description given herein with respect to these figures is for explanatory purposes as the invention extends beyond these limited embodiments.

Figure 1A:
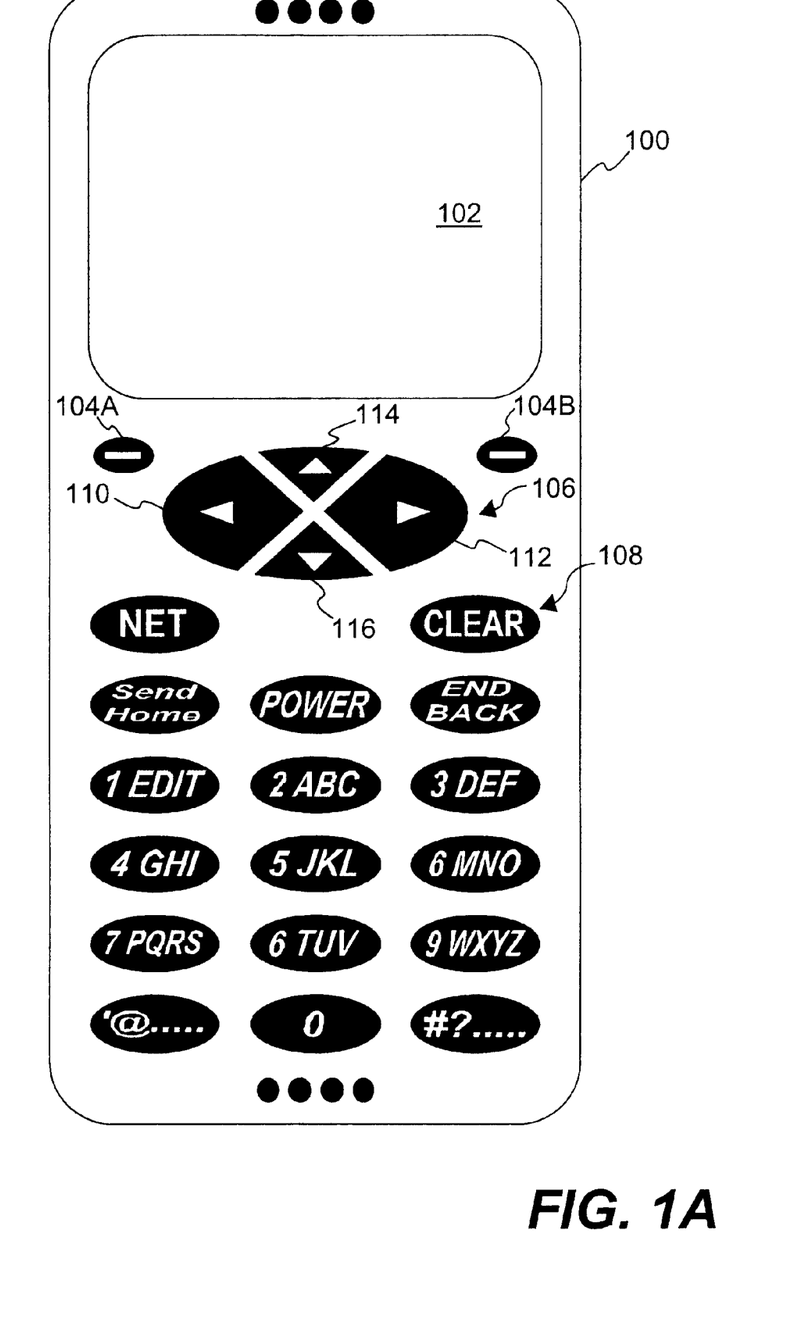
FIG. 1A is a diagram of a mobile device according to one embodiment of the invention.

FIG. 1A is a diagram of a mobile device 100 according to one embodiment of the invention. The mobile device 100 is also referred to as a two-way mobile communication device. The mobile device 100 communicates with remote entities through a wireless network (not shown). Examples of commonly used wireless networks include Cellular Digital Packet Data (CDPD), Global System for Mobile Communications (GSM), Code Division Multiple Access (CDMA) and Time Division Multiple Access (TDMA), to name a few. The mobile device 100 can operate various applications. Exemplary applications include an email application, an address book application, a notebook application, and a network browser application. The network browser provided by the network browser application is, for example, a HTML browser, a HDML browser or a WML browser.

The mobile device 100 includes an enhanced display 102 capable of displaying information (e.g., menus, lists, text, graphics). The mobile device 100 also includes soft keys 104A and 104B, navigation key group 106, and a phone keypad 108. A typical phone keypad, as commonly seen, comprises twelve buttons. Of the twelve buttons, ten buttons are consecutively numbered "0" to "9", one button is for "*" sign and the other button is for "#" sign. Besides such typical buttons, the phone keypad 108 of the mobile device 100 may contain extra buttons which provide added convenience and functionality. In this embodiment, the extra buttons include various miscellaneous keys, namely, NET, CLEAR, Send/Home, Power, and End/Back. The functionality of the miscellaneous keys are well known in the art. The navigation key group 106 includes four buttons (keys), a left arrow button 110, a right arrow button 112, an up arrow button 114, and a down arrow button 116. These navigation buttons can, among other things, be used to move a cursor on the display 102. For example, when entering text, the text often requires editing and thus the cursor has to be moved to the appropriate location within the displayed text where the editing is to occur. The invention provides enhanced cursor navigation using at least a pair of navigation buttons (keys). The pair of navigation buttons can be the left arrow button 110 and the right arrow button 112, the up arrow button 114 and the down arrow button 116, the soft keys 104A and 104B (when assigned to a navigation function), or some other pair of buttons suitably configured. The soft keys 104A and 104B, the navigation key group 106 and the phone keypad 108 provide a convenient and efficient means for a user to interact with the mobile device 100. Further, it is to be understood by those of ordinary skill in the art that the present invention may be practiced using other types of input interfaces (e.g., soft keys, iconic screens) and keypad configurations.

As used herein, a display is the physical display apparatus of a mobile device. As an example, the display screen can be a Liquid Crystal Display (LCD) screen. A screen is an image presented or displayed on the display.

Figure 1B:
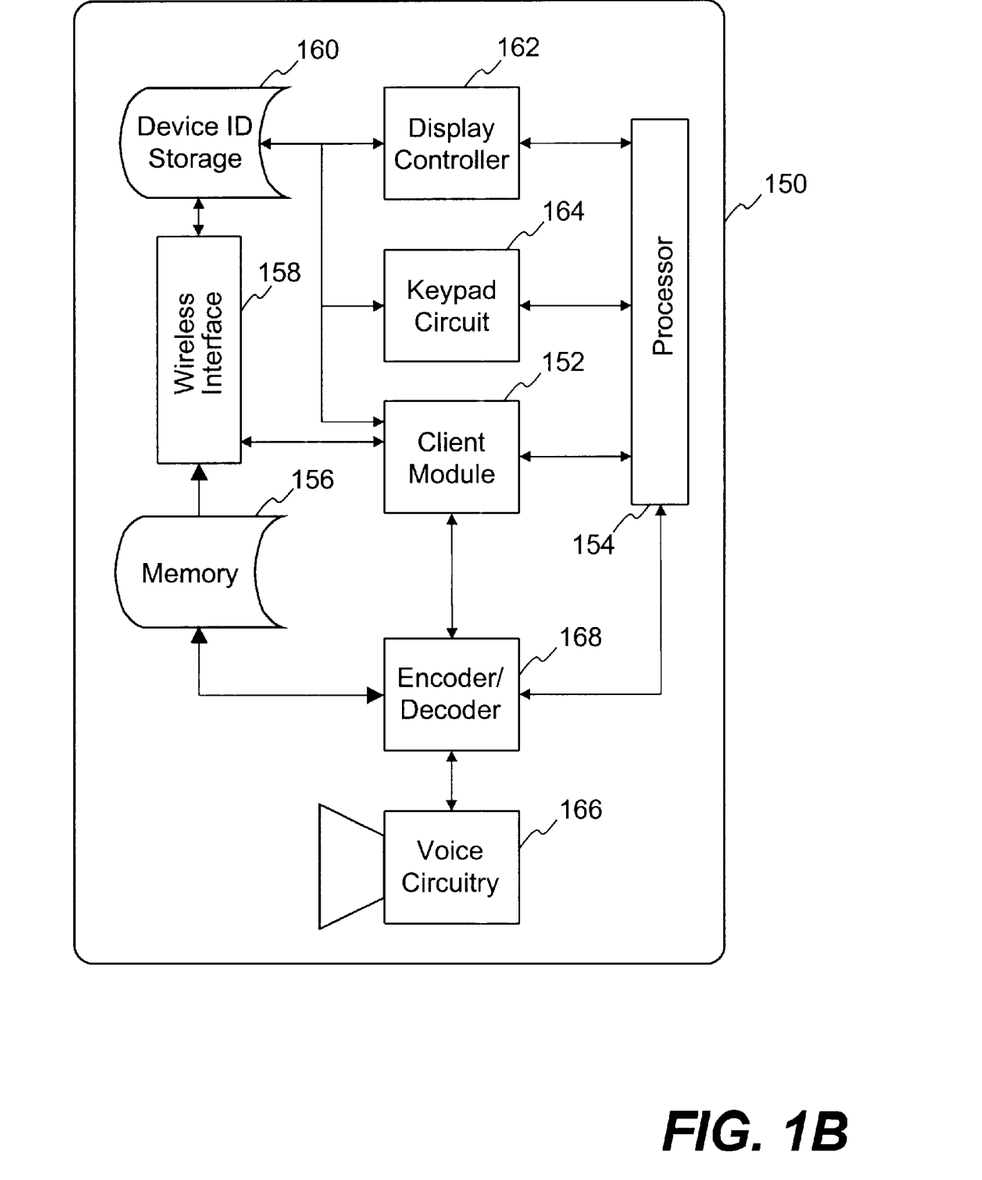
FIG. 1B is a functional block diagram of a mobile device according to one embodiment of the invention.

FIG. 1B is a functional block diagram of a mobile device 150 (also referred to as a two-way mobile communication device) according to one embodiment of the invention. Mobile device 150 is, for example, suitable for use as the mobile device 100 of FIG. 1A.

The mobile device 150 includes a client module 152 which works in conjunction with processor 154 and working memory 156 to perform the processing tasks performed by the mobile device 150. These processing tasks include operation of the various applications resident on the mobile device 150, management of communication processing, and management of keypad input.

The mobile device 150 further includes a wireless interface 158 that couples to a wireless network via a RF transceiver (not shown) to receive incoming and outgoing data signals. A device identifier (ID) storage 160 supplies a device ID to the wireless interface 158. The device ID identifies a specific code that is associated with the mobile device 150. As an example, the mobile device 150 can couple to a proxy server (not shown) through the wireless network where the device ID is used to locate a subscriber (user) account provided in the proxy server, and then the proxy server couples to a network such as the Internet.

In addition, mobile device 150 includes a display controller 162 for displaying information on a display, and receives user input from a user via a keypad controlled by keypad circuit 164. Additionally, the client module 152 operates, among other things, a browser, commonly referred to as microbrowser, requiring much less computing power and memory than well-known HTML browsers do. Additional details on accessing a (proxy) server device from a mobile device using a (micro) browser are described in U.S. Pat. No. 5,809,415 which is hereby incorporated by reference in its entirety.

The mobile device 150 also includes the voice circuitry 166 (e.g., a speaker and a microphone) and the associated hardware (e.g., encoder/decoder 168, processor 154 and keypad circuit 164) which allows it to switch to a telephone mode of operation which is separate and distinct from a network (data) mode of operation.

According to the invention, a user wishing to edit previously entered text can efficiently navigate a cursor to an edit location within previously entered text so that the text can be edited. The invention provides improved cursor navigation by automatically switching between a character mode and a word mode as appropriate.

Figure 2:
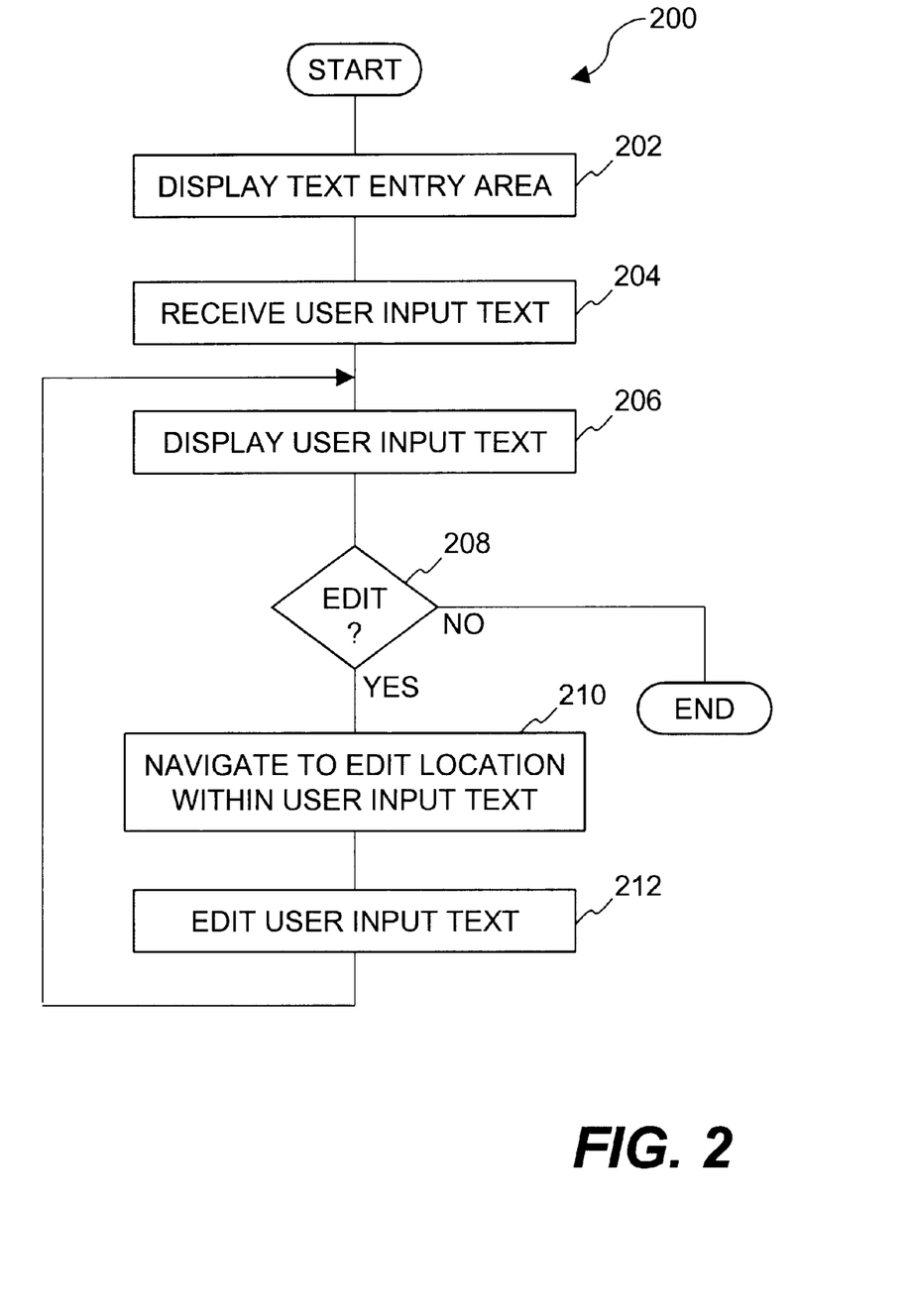
FIG. 2 is a flow diagram of text edit and entry processing according to one embodiment of the invention.

FIG. 2 is a flow diagram of text edit and entry processing 200 according to one embodiment of the invention. The text entry and edit processing 200 is, for example, performed by a mobile device such as the mobile phone 100 illustrated in FIG. 1A.

The text entry and edit processing 200 begins by displaying 202 a text entry area. The text entry area facilitates the entry of text by a user of the mobile device. The text entry area is displayed 202 on a display associated with the mobile device. Next, user input text is received 204. As the user enters text (or characters) via a keypad associated with the mobile device, the user input text is received by the mobile device. The user input text is also displayed 206 on the display of the mobile device.

During or following the user's input of text, the user is able to edit the user input text. Here, a decision 208 determines whether the user desires to edit the user input text. When the user input text has been completely entered and the user does not desire to edit the user input text, then the text entry and edit processing 200 is complete and ends. On the other hand, when the decision 208 determines that the user does desire to edit the user input text, then the user navigates 210 to an edit location within the user input text. The navigation 210 is typically achieved through the user's pressing of cursor movement keys of the keypad until the edit location is reached. According to the invention, the navigation to the edit location is achieved in an efficient manner by automatically alternating between moving the cursor one character at a time and moving the cursor one word at a time. Additional details on the navigation of the cursor are provided below with respect to FIG. 3 and FIGS. 4A and 4B. After the edit location has been navigated to, the user input text can then be edited 212. With the cursor at the edit location, the user is able to edit the user input text. After the user input text has been edited as desired by the user, the text entry and edit processing 200 returns to repeat the operation 206 and subsequent operations so that the newly edited user input text can be displayed on the display of the mobile device and further editing thereafter permitted.

Figure 3:
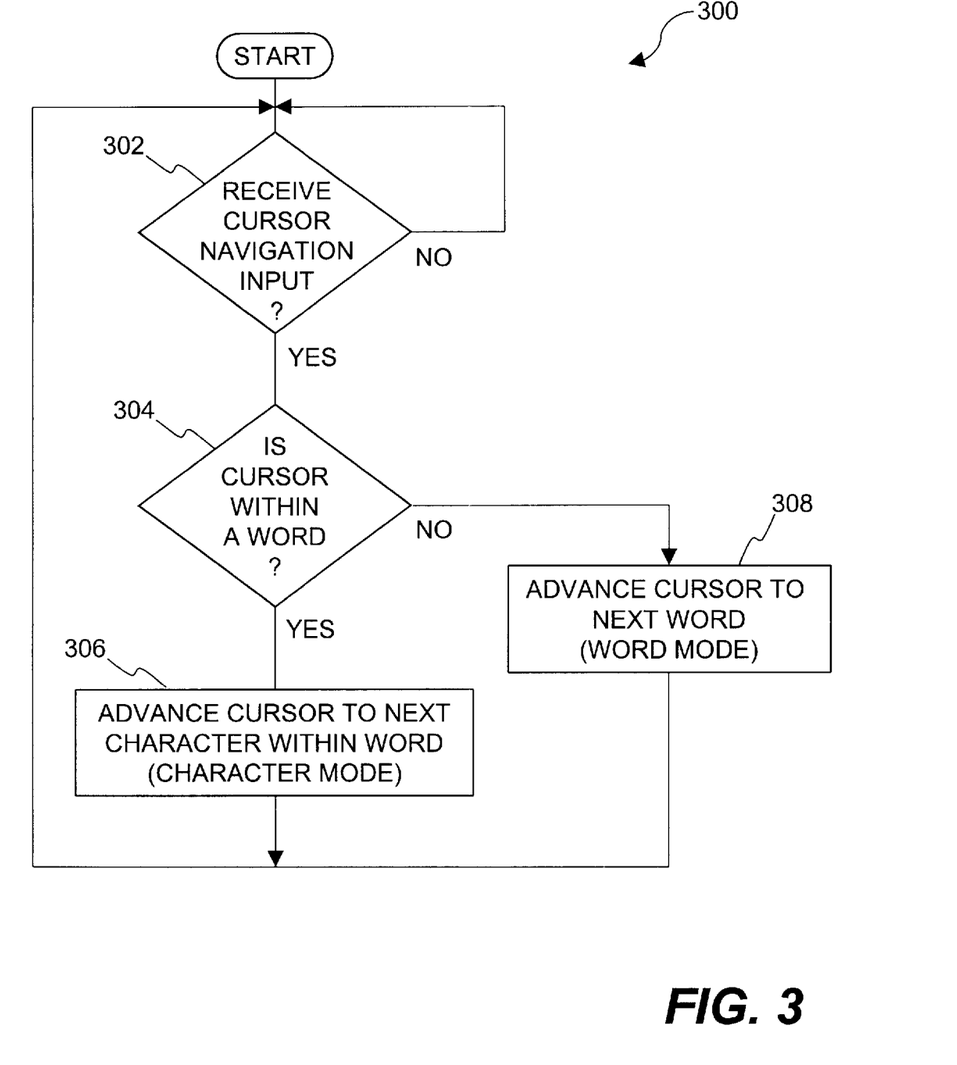
FIG. 3 is a flow diagram of basic text navigation processing according to one embodiment of the invention.

FIG. 3 is a flow diagram of basic text navigation processing 300 according to one embodiment of the invention. The basic text navigation processing 300 is utilized to move a cursor to an edit location within previously input text that is to be edited.

The basic text navigation processing 300 begins with a decision 302 that determines whether a cursor navigation input has been received. As an example, the cursor navigation input can pertain to direction or arrow keys (buttons) such as provided on a keypad. In one embodiment, the cursor navigation input can pertain to pressing a forward direction key or a backward direction key. When the decision 302 determines that a cursor navigation input has not been received, then the basic text navigation processing 300 awaits such an input. Once the decision 302 determines that a cursor navigation input has been received, then a decision determines whether the cursor is presently within a word of the previously input text. There are various ways to determine whether a cursor is within a word. In one embodiment, the cursor is determined to be within a word when the next character, considering the direction in which the cursor navigation input is requesting, is a word delimiter. There are various different word delimiters that may be utilized. In one embodiment, the word delimiter can be a space character. In another embodiment, a particular symbol can serve as a word delimiter.

When the decision 304 determines that the cursor is within a word, then the cursor is advanced 306 to the next character within the word. When the cursor is advanced in this manner, the cursor movement can be said to operate in a character mode. Alternatively, when the decision 304 determines that the cursor is not within a word, then the cursor is advanced 308 to the next word. Typically, the next word is adjacent the current word in the direction associated with the cursor navigation input. In one embodiment, the direction of the cursor navigation input is either forward or backward (left or right). In this situation, when the cursor is advanced 308 to the next word, the cursor navigation can be said to operate in a word mode. Optionally, when advancing 308 to the next word, the entire next word can be selected (and so indicated by being highlighted) to facilitate deletion of such word which may assist the user in editing the previously input text. In any event, following operations 306 or 308, the basic text navigation processing 300 returns to repeat the decision 302 and subsequent blocks so that other cursor navigation inputs that have or will be received can be processed.

Figure 4A:
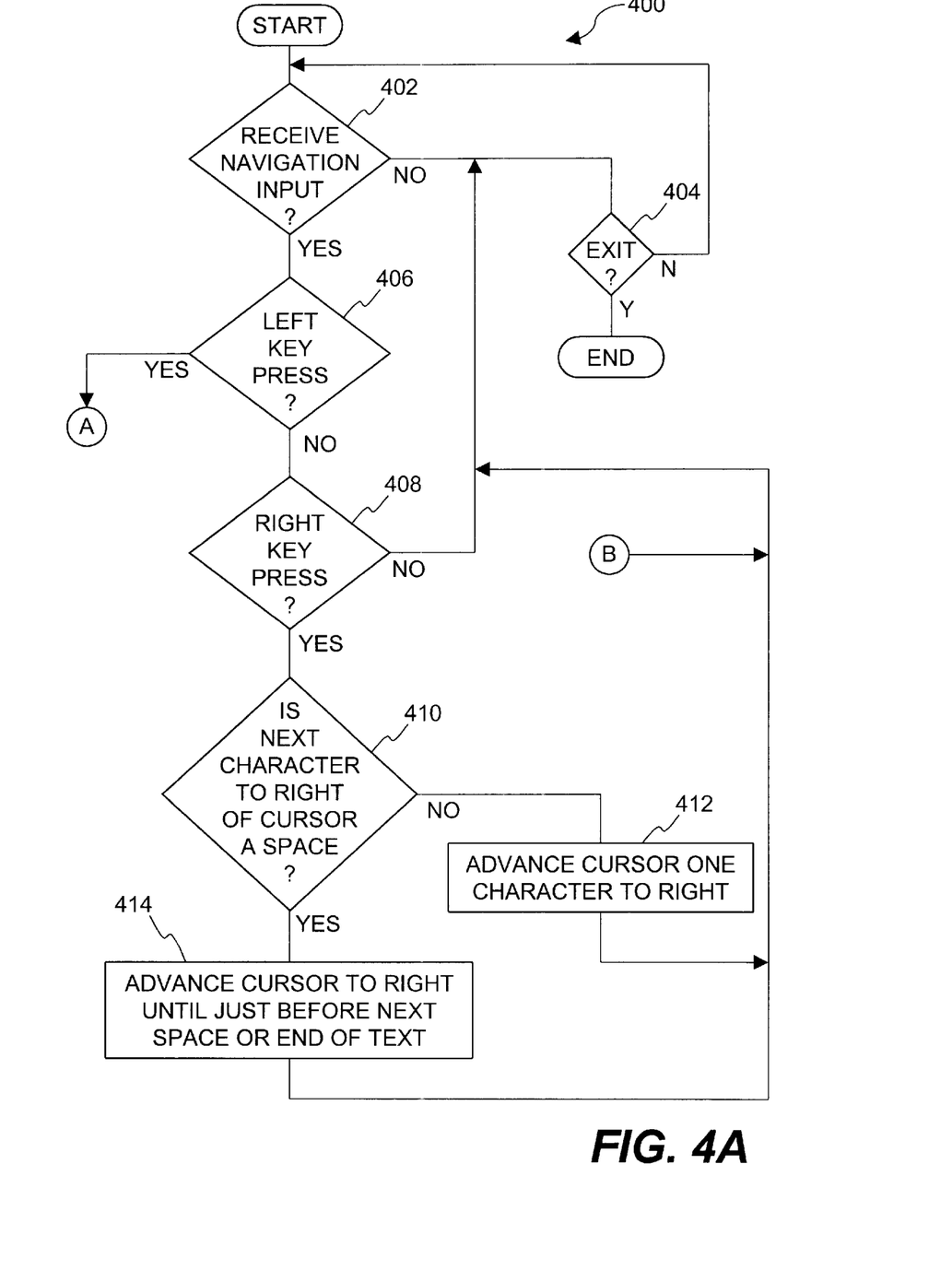
FIGS. 4A and 4B are flow diagrams of text navigation processing according to one embodiment of the invention.
Figure 4B:
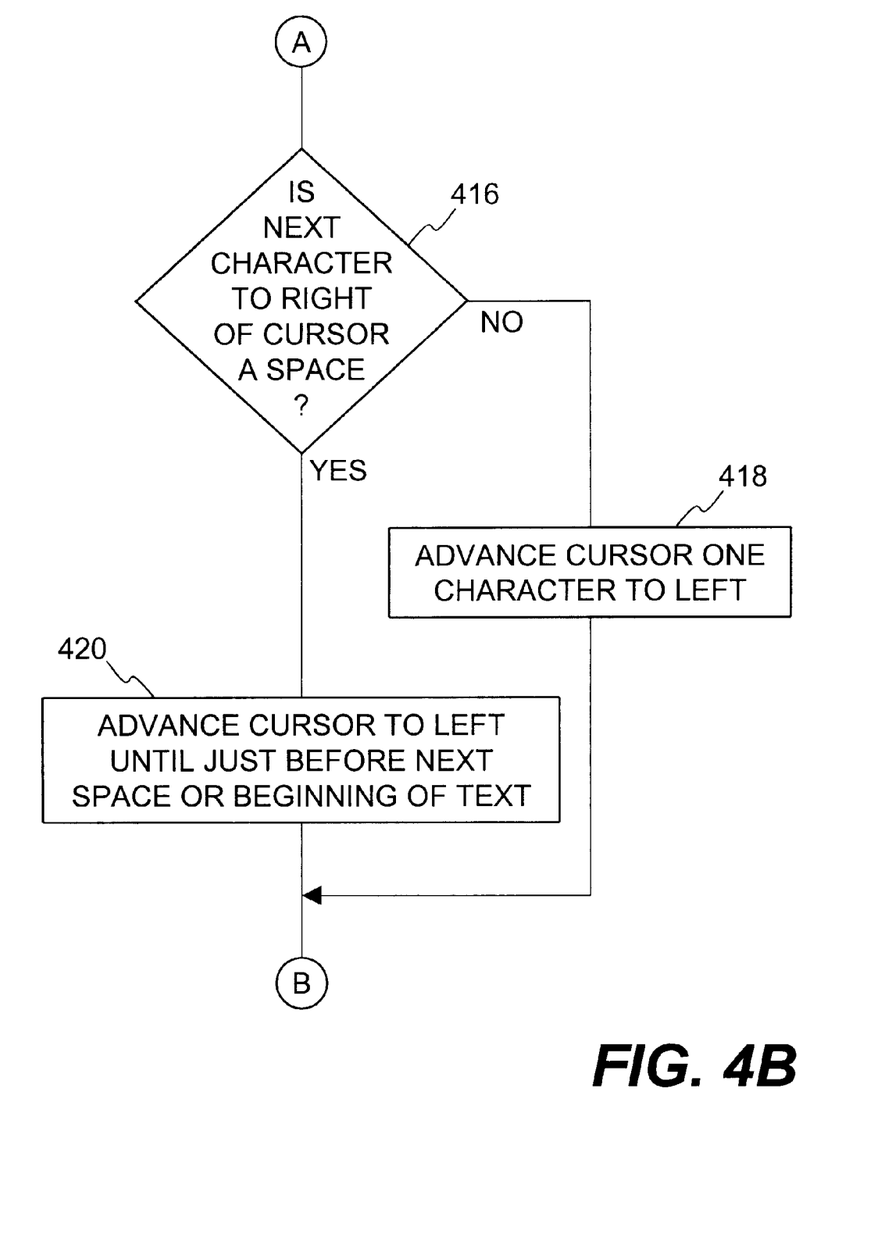

FIGS. 4A and 4B are flow diagrams of text navigation processing 400 according to one embodiment of the invention. The text navigation processing 400 is, for example, performed by a mobile device such as the mobile device 100 illustrated in FIG. 1A. The text navigation processing 400 represents a more detailed embodiment of the basic text navigation processing 300 illustrated in FIG. 3.

The text navigation processing 400 begins with a decision 402 that determines whether a navigation input has been received. When the decision 402 determines that a navigation input has not yet been received, then a decision 404 determines whether the text navigation processing 400 should be exited. When the decision 404 determines that the text navigation processing 400 should be exited, then the text navigation processing 400 is complete and ends. Alternatively, when the decision 404 determines that the text navigation processing 400 should not be exited, then the text navigation processing 400 returns to repeat the decision 402 and subsequent blocks.

On the other hand, when the decision 402 determines that a navigation input has been received, then a decision 406 determines whether the navigation input is a left key press. When the decision 406 determines that the navigation input is not a left key press, then a decision 408 determines whether the navigation input is a right key press. The left and right key presses can be assigned to a pair of keys (buttons) on a keypad of the mobile device performing the text navigation processing 400. In one implementation, the left key can correspond to a left arrow key and the right key can correspond to a right arrow key. When the decision 408 determines that the navigation input is not a right key press, then the text navigation processing 400 returns to repeat the decision 404 and other operations.

Alternatively, when the decision 408 determines that navigation input is a right key press, then a decision 410 determines whether the next character to the right of the cursor is a space. Here, the space serves as a word delimiter that separates words within the text being navigated. When the decision 410 determines that the next character to the right of the cursor is not a space, then the cursor is advanced 412 one character to the right. On the other hand, when the decision 410 determines that the next character to the right of the cursor is a space, then the cursor is advanced 414 to the right until just before the next space or the end of the text, whichever comes first. Hence, if there is at least one additional (next) word that follows the current word, then the cursor is advanced to the end of the next (subsequent) word. However, when there are no more additional words following the current word, then the cursor is advanced to the end of the text. Following operations 412 or 414, the navigation input, which was the right key press, has been fully processed and the text navigation processing 400 returns to repeat the decision 404 and other operations so that additional navigation inputs can be processed.

On the other hand, when the decision 406 determines that the navigation input is a left key press, then a decision 416 determines whether the next character to the left of the cursor is a space. Here, the space serves as a word delimiter. When the decision 416 determines that the next character to the left of the cursor is not a space, then the cursor is advanced 418 one character to the left. Alternatively, when the decision 416 determines that the next character to the left of the cursor is a space, then the cursor is advanced 420 to the left until just before the next space or the beginning of the text, whichever occurs first. Here, when advancing to the left (i.e., in the backward direction), if there are additional words, the cursor is advanced to the left until just before the next space, which corresponds to the beginning of the next (prior) word. Alternatively, when there are no additional words to the left of the cursor, the cursor is advanced to the beginning of the text. Following operations 418 and 420, the text navigation processing 400 returns to repeat the decision 404 and other operations so that additional navigation inputs can be processed.

Figure 5A:
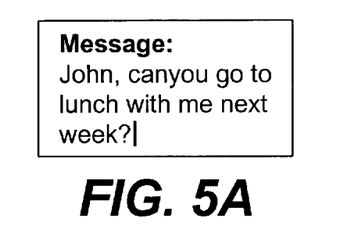
FIGS. 5A–5Q are screen displays associated with an exemplary text edit operation.
Figure 5B:
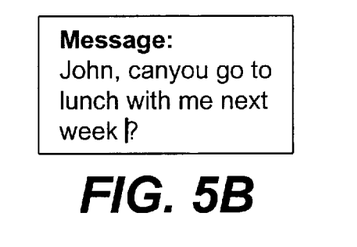
Figure 5C:
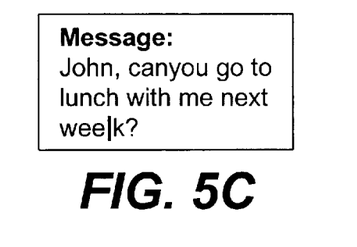
Figure 5D:
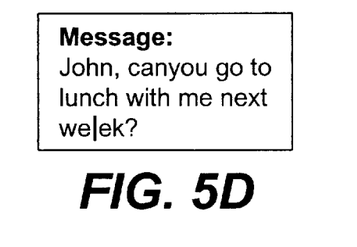
Figure 5E:
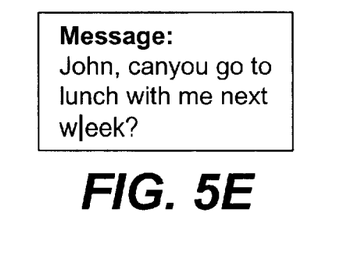
Figure 5F:
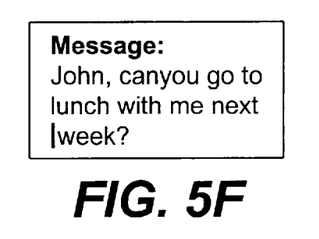
Figure 5G:
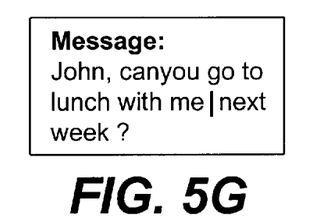
Figure 5H:
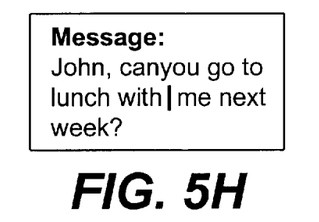
Figure 5I:
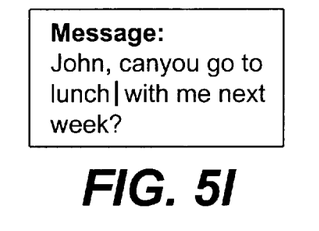
Figure 5J:
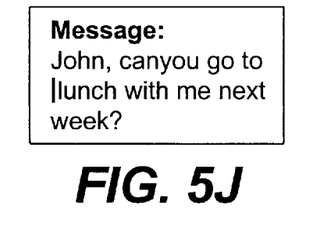
Figure 5K:
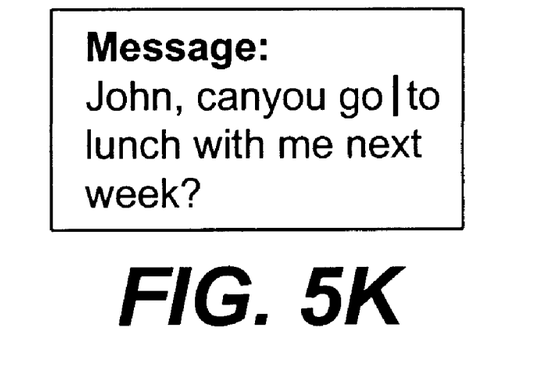
Figure 5L:
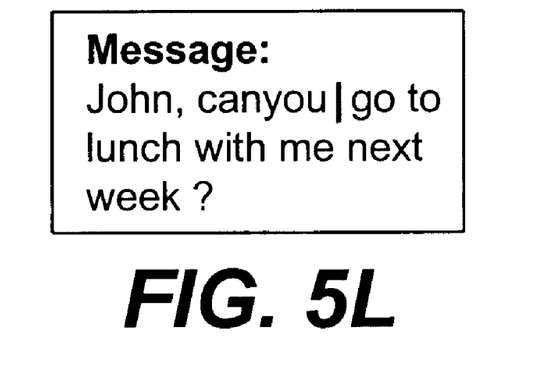
Figure 5M:
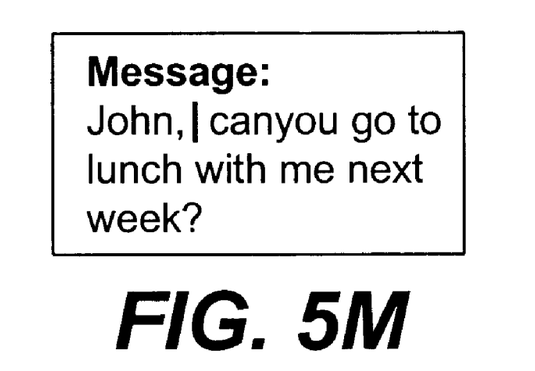
Figure 5N:
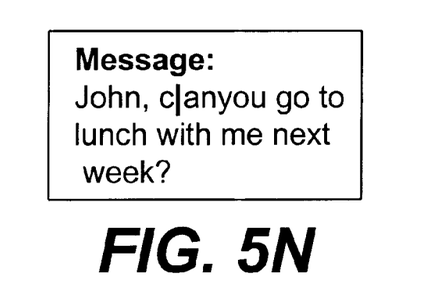
Figure 5O:
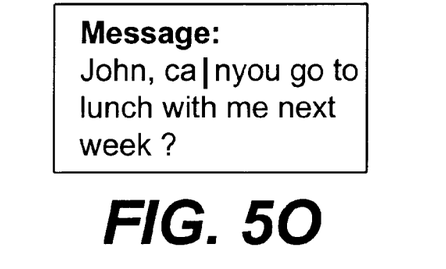
Figure 5P:
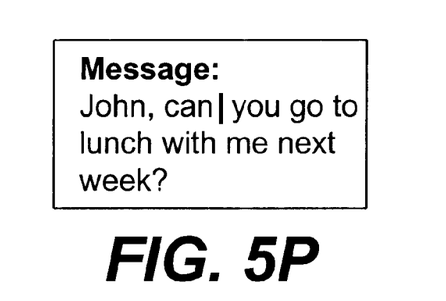
Figure 5Q:
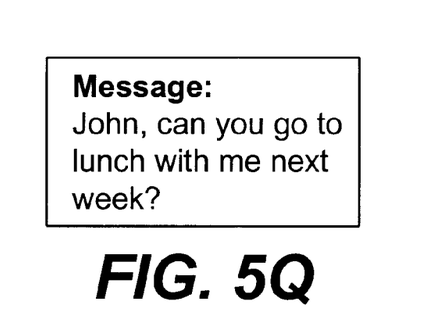

FIGS. 5A–5Q are screen displays associated with an exemplary text edit operation. These screens are associated with a display area (e.g., text display area) of a mobile device. FIG. 5A is a screen that displays user input text after the user has input a particular message. However, after entering the text shown in FIG. 5A, the user notices that there was a typographical error that needs to be corrected. The typographical error was that "canyou" should have been "can you". However, since the cursor is currently at the end of the user input text, the cursor must be moved to the edit location before the typographical error can be corrected. However, with mobile devices having limited numbers of keys and processing capabilities, the movement of the cursor tends to be cumbersome. Fortunately, according to the invention, the cursor can be moved with improved efficiency to the edit location. FIGS. 5B–5P illustrate the series of steps that occur to move the cursor from the end of the user input text (see FIG. 5A) to the edit location according to one embodiment of the invention. A series of user navigation inputs, namely, left arrow keys, are entered by the user to move the cursor. In each case, the user navigation input is requesting that the cursor be moved to the left (or backwards). Hence, FIG. 5B illustrates the cursor being moved one character to the left following a left arrow key press. Similarly, FIGS. 5C–5F illustrates the cursor being successively moved one character to the left from a series of four (4) additional left arrow key presses. However, with the next seven (7) left arrow key presses, the cursor is moved by an entire word. FIGS. 5G–5M illustrates the cursor being successively moved one word to the left following the next seven (7) left arrow key presses. Then, since the cursor is now to the left of the edit location (see FIG. 5M), the user will enter a series of three (3) right arrow key presses to move the cursor to the edit location. These three (3) left arrow key presses cause the cursor to successively be move one character to the right as respectively illustrated in FIGS. 5N–5P.

Accordingly, as illustrated in FIG. 5P, the cursor resides in the edit location following these various user navigation inputs. Then, the user is able to edit the original user input text by inserting a space at the edit location. In this example, the editing requires only the inserting of a single space at the edit location. However, in general, the nature of the editing will depend on the user and varies widely in type and quantity. The resulting corrected user input text is then illustrated in FIG. 5Q.

Hence, according to this exemplary example of the invention, fifteen (15) key presses were required to move the cursor to the edit location. In contrast, in a conventional system thirty-four (34) key presses would have been required. Accordingly, the invention offers a substantial improvement in the number of key presses required to reach many edit locations. The substantial reduction in key presses required is a substantial benefit to users of mobile devices because such key presses are tedious and lead to user frustration.

Additional features or enhancements of the invention may be utilized. For example, when multiple spaces separate words, the multiple spaces can be treated as a single space. Word delimiters other than a space can be utilized, such as various different symbols (e.g., dashes, or periods).

Preferably, the mobile device has at least two navigation keys, preferably a left arrow key and a right arrow key. However, if the mobile device does not have left and right arrow keys, then other navigation keys, such as up and down arrows, may be utilized. In general, any pair of keys can be utilized and associated with the navigation of the cursor left and right (backward and forward).

Further, the invention can be expanded to automatically jump to preceding paragraphs or sentences, assuming the user input text has numerous paragraphs or sentences. The sentence delimiters can, for example, be periods and the paragraph delimiters can be line breaks.

The invention can be further altered to better fit certain applications or situations. For example, the transitioning to the word mode from the character mode can be deferred until two words have been traversed in the character mode instead of after one word as discussed above. Deferring the transition to word mode until traversing two words would retain the character mode longer which might be beneficial if the cursor is being moved to a location within the second of the two words.

The invention can also be optimized to automatically switch back to the character mode when the cursor reaches the first or last word of the text. Such would assume that the user would want to edit this first or last word since they have navigated to such location. This would, perhaps, save the user a few keystrokes of having to go past the initial or last word and then changing directions to reach the desired edit location with respect to the word.

The advantages of the invention are numerous. Different embodiments or implementations may yield one or more of the following advantages. One advantage of the invention is that cursor navigation is more efficient and less burdensome for users of mobile devices. Another advantage of the invention is that a user is often able to move a cursor within text with fewer button presses and greater speed.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for navigating through text being displayed on a display of a mobile device, said method comprising:
   receiving a cursor navigation input that requests movement of a cursor in a particular direction with respect to the text;
   determining whether the cursor is within a word of the text;
   advancing the cursor to a next character of the text in the particular direction when said determining determines that the cursor is within a word of the text; and
   advancing the cursor to a next word of the text in the particular direction when said determining determines that the cursor is not within a word of the text.

2. A method as recited in claim 1, wherein said determining is influenced by the particular direction of the cursor navigation input.

3. A method as recited in claim 1, wherein said determining determines whether the cursor is within the word based on whether the next character of the text in the particular direction is a word delimiter.

4. A method as recited in claim 3, wherein the word delimiter is a space.

5. A method as recited in claim 3, wherein the mobile device is a mobile telephone having the display and a keypad, and where the display has a limited size, and the cursor navigation input is provided via the keypad.

6. A method as recited in claim 3, wherein said advancing of the cursor to the next word comprises selecting the next word.

7. A method as recited in claim 1, wherein the mobile device is a two-way mobile communication device.

8. A method as recited in claim 1, wherein the mobile device is selected from the group consisting of: personal digital assistant, cellular phone and two-way pager.

9. A method as recited in claim 1, wherein the mobile device has a keypad, and where the keypad includes at least a first arrow button and a second arrow button, and
   wherein the cursor navigation input results from pressing one of the first arrow button and the second arrow button.

10. A method for navigating a cursor through text displayed on a display of a mobile device, the mobile device having a keypad, said method comprising:
    receiving a navigation input via the keypad;
    determining whether the navigation input requests movement of the cursor in a forward or backward direction with respect to the text;
    when said determining determines that the navigation input requests movement of the cursor in the forward direction,
    determining whether a next character in the text in the forward direction from the cursor is a word delimiter;
    advancing the cursor one character in the forward direction when said determining determines that the next character in the text in the forward direction from the cursor is not a word delimiter; and
    advancing the cursor in the forward direction until just before a next word delimiter or the end of the text, whichever occurs first, when said determining determines that the next character in the text in the forward direction from the cursor is a word delimiter; and
    when said determining determines that the navigation input requests movement of the cursor in the backward direction,
    determining whether a next character in the text in the backward direction from the cursor is a word delimiter;
    advancing the cursor one character in the backward direction when said determining determines that the next character in the text in the backward direction from the cursor is not a word delimiter; and
    advancing the cursor in the backward direction until just before a next word delimiter or the beginning of the text, whichever occurs first, when said determining determines that the next character in the text in the backward direction from the cursor is a word delimiter.

11. A method as recited in claim 10, wherein the word delimiter is a space.

12. A method as recited in claim 10, wherein the keypad includes at least a backward button and a forward button, and
    wherein the navigation input is at least one of a left key press and a right key press.

13. A method as recited in claim 10, wherein the mobile device is a mobile telephone having the display and the keypad, and where the display has a limited size, and the cursor navigation input is provided via the keypad.

14. A method as recited in claim 10, wherein when advancing the cursor in the backward or forward direction until just before a next word delimiter, a next word is selected and distinguishably displayed on the display.

15. A computer readable medium including at least computer program code for navigating a cursor through text displayed on a display of a mobile device, the mobile device having a keypad, said computer readable medium comprising:

computer program code for receiving a navigation input via the keypad, the navigation input requesting movement of the cursor in a particular direction with respect to the text;

computer program code for determining whether a next character in the text in the particular direction from the cursor is a word delimiter;

computer program code for advancing the cursor one character within the text in the particular direction when said computer program code for determining determines that the next character in the text in the particular direction from the cursor is not a word delimiter; and computer program code for advancing the cursor within the text in the particular direction until just before a subsequent word delimiter when said computer program code for determining determines that the next character in the text in the particular direction from the cursor is a word delimiter.

16. A computer readable medium as recited in claim 15, wherein the mobile device is a mobile telephone having the display and the keypad, and where the display has a limited size, and the cursor navigation input is provided via the keypad.

17. A computer readable medium as recited in claim 15, wherein the word delimiter is a space.

18. A computer readable medium as recited in claim 15, wherein the keypad comprises a left arrow key and a right arrow key, and wherein the navigation input results from at least one of a left arrow key press and a right arrow key press.

19. A computer readable medium as recited in claim 15, wherein the subsequent word delimiter is a next word delimiter.

20. A mobile device, comprising:

a display configured to display text entered by a user;

a keypad to facilitate text entry by the user; and a processor configured to control operation of said mobile device, said processor being configured to provide assisted navigation through the text being displayed on said display by operating to receive a cursor navigation input that requests movement of a cursor in a particular direction with respect to the text, to determine whether the cursor is within a word of the text, to advance the cursor to a next character of the text in the particular direction when it is determined that the cursor is within a word of the text; and to advance the cursor to a next word of the text in the particular direction when it is determined that the cursor is not within a word of the text.

21. A mobile device as recited in claim 20, wherein the mobile device is a mobile telephone.

\* \* \* \* \*